June 23, 1964 S. C. WILKINS 3,138,269
SEMITRAILER WITH ELEVATOR
Filed March 14, 1963 3 Sheets-Sheet 1

STANLEY C. WILKINS,
*INVENTOR.*

BY *Harry M. Saragovitz*
*Edward J. Kelly*
*Herbert Berl*
*Charles C. Wells*

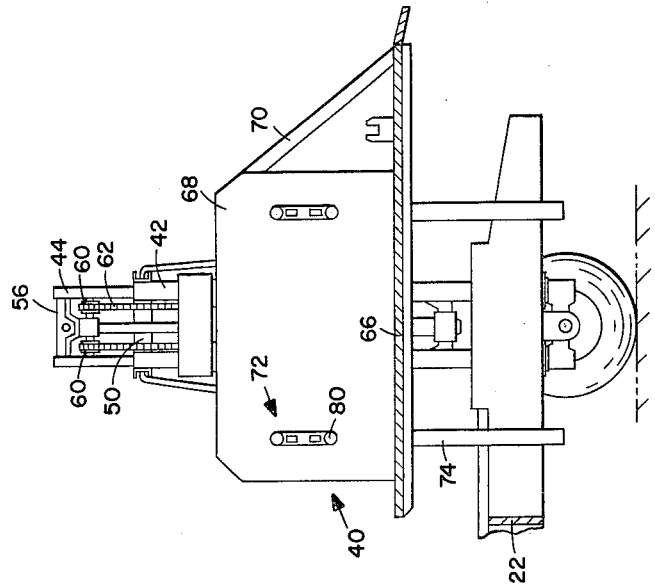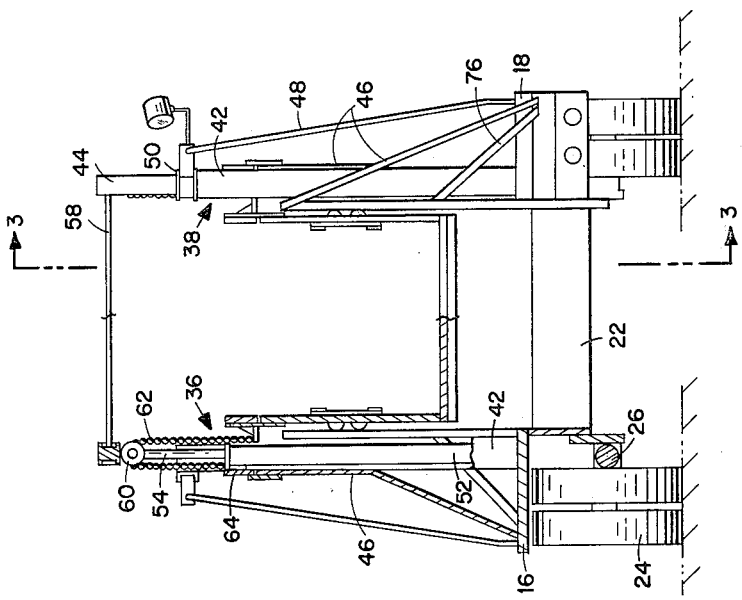

STANLEY C. WILKINS,
*INVENTOR.*

United States Patent Office 3,138,269
Patented June 23, 1964

3,138,269
SEMITRAILER WITH ELEVATOR
Stanley C. Wilkins, 1605 Big Cove Road SE.,
Huntsville, Ala.
Filed Mar. 14, 1963, Ser. No. 265,602
4 Claims. (Cl. 214—75)
(Granted under Title 35, U.S. Code (1952), sec. 266)

The invention described herein may be manufactured and used by or for the Government for governmental purposes without the payment of any royalty thereon.

This invention relates to a vehicle for transporting other heavy vehicles and more particularly the invention pertains to a semi-trailer with an elevator for loading, unloading and transporting industrial vehicles. The invention described in detail hereafter is particularly useful in transporting fork lift trucks.

Fork lift trucks powered by either electric motors or gasoline engines are in extensive use in warehouses and other material storage facilities. These forklifts have small, unsprung solid rubber wheels and are counterweighted so that heavy loads can be lifted. The small wheels and counterweights are features which enable the fork lifts to lift and move heavy materials situated in localized areas such as warehouses. These same features however, limit such fork lifts to travel over relatively smooth and level surfaces. Therefore, if it is necessary to move such a fork lift over a considerable distance, from one warehouse to another for example, it is necessary to load them on another vehicle for the move. Dump trucks and various other vehicles utilized to move these fork lifts have proven unsatisfactory in that the fork lift must travel up or down a ramp to be loaded. The use of such ramps is precarious even under good conditions and in wet and freezing weather their use is exccedingly dangerous.

The present invention solves the problem of loading heavy vehicles by providing a trailer that includes an elevatable loading box adapted to receive such a vehicle and raise or lower it to a desired level. This invention contemplates that a fork lift on an elevated warehouse platform or dock, as well as one on the ground, can be driven directly on to the loading box and then raised or lowered to trailer level where it can be driven on to the trailer.

The primary object of this invention is to provide a trailer that is capable of safely and easily loading a heavy vehicle such as a fork lift.

A further object of this invention is to provide a trailer having a loading box that will raise and lower a fork lift when the trailer is not level.

Another object of this invention is to provide a trailer that can load or unload a fork lift at ground level or from a warehouse platform level having a height of several feet.

Other objects and advantages of the instant invention will be apparent from the following description and the attached drawings, wherein:

FIGURE 2 is an end elevation, partially in section, taken along lines 2—2 of FIGURE 1.

FIGURE 3 is a cross-sectional view taken along lines 3—3 of FIGURE 2.

Figure 1:
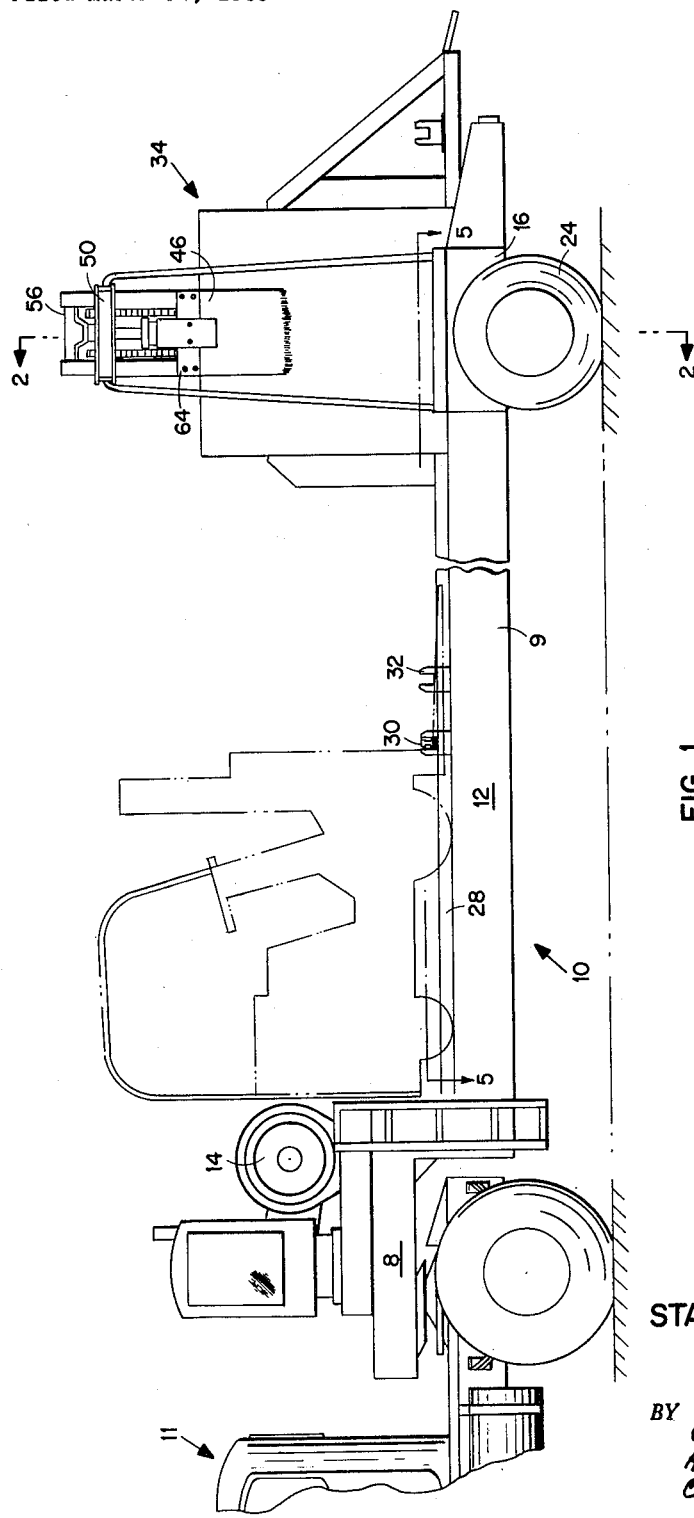
FIGURE 1 is a side elevation of a trailer embodying the present invention wherein the trailer is hooked to a prime mover and a fork lift, shown in dot-dash lines, is loaded on the trailer.
Figure 5:
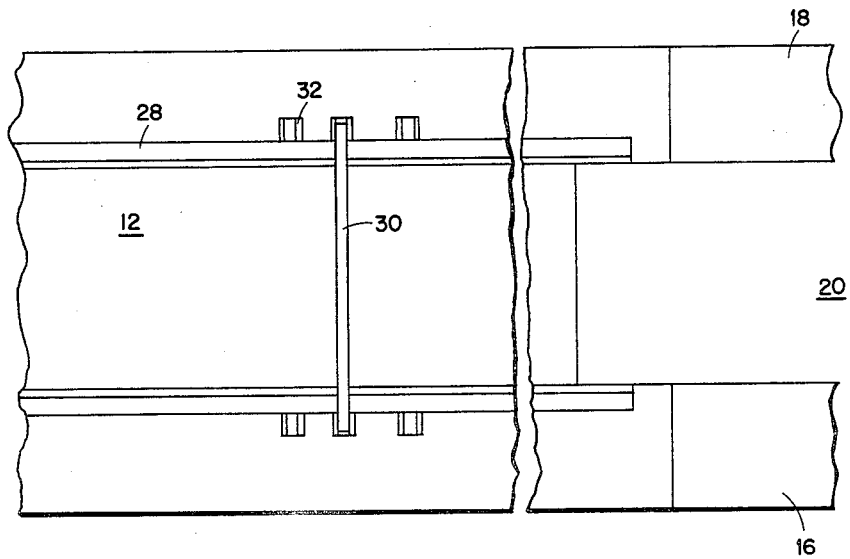
FIGURE 5 is a plan view of the rearward end of the trailer with the hoist mechanism removed.

A semitrailer 10 illustrated in FIGURE 1, includes a chassis 12 having two levels, a raised forward end 8 and a lower rearward end 9 that is bifurcated. The raised forward end 8 is shown attached to a truck or prime mover 11 in a conventional manner. A winch mechanism 14 for loading disabled fork lifts which cannot move under their own power is mounted on the forward end 8 (FIGURE 1). The lower end of the trailer is rectangular in shape and includes two laterally spaced rearwardly extending, support members 16 and 18 (FIGURE 2). The two members 16 and 18 define a centrally located, rearwardly opening slot 20 (FIGURE 5) therebetween. The forward end of said slot is closed by a transverse reinforcing plate 22 (FIGURE 3) forming a part of the chassis. Two sets of dual wheels 24 are mounted on stub axles 26, a stub axle 26 being suspended beneath and adjacent the rear end of each support member 16 and 18. The lower end of the trailer is the load carrying portion, and, as is apparent from FIGURE 1, several fork lifts can be loaded thereon. The fork lifts are prevented from sliding while being transported by means of longitudinally extending rails 28 (FIGURE 5) fixed to the trailer and by transverse cross-bars 30 held in place by brackets 32 attached to the rails.

A hoisting mechanism or elevator 34 is mounted on the rear extremity of the trailer to receive and raise or lower a fork lift to the lower trailer level. The hoist mechanism includes two oppositely disposed hoists 36 and 38 (FIGURE 2), one hoist being mounted on respective support members 16 and 18. The hoist mechanism further includes a loading box 40 (FIGURE 3) movable through the open ended slot in the trailer and the loading box is raised and lowered by the two hoists. Each of the two hoists and the opposite sides of the loading box and trailer are identical.

Each hoist includes a telescoping track assembly composed of two fixed guide members 42 with a pair of rail members 44 slidably mounted therein. The track assembly is held in an upright position by plate 46 which is suitably attached to support member 18 and fixed guide members 42. Additional support for the guide members is provided by rods 48 connected between the support member and a beam 50. Beam 50 maintains the upper end of the guide members in a fixed parallel relation. A hydraulic motor disposed between the fixed guide members includes a pressure cylinder 52, a piston (not shown), and a piston rod 54. The hydraulic motor is in communication with a suitable supply of hydraulic fluid under pressure (not shown) for operation thereof. The upper ends of rail members 44 are secured in fixed parallel relation by cross-beam 56. Additional support for rail members 44 is provided by a cross-bar 58. Cross-beam 56 supports an idler sprocket assembly having two rotatably mounted sprockets 60. The upper end of piston rod 54 is fixed to the sprocket assembly. A chain 62 rides over each of the idler sprockets and each chain has one of its ends attached to a fixed plate 64. The other end of each of said chains is attached to loading box 40. It is apparent from the foregoing description that operation of the hydraulic device, whereby the piston rod is raised or lowered, will result in vertical movement of rail members 44 and loading box 40.

Figure 4:
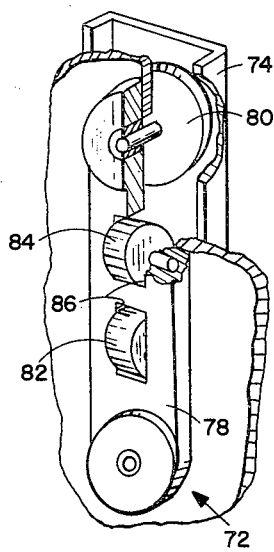
FIGURE 4 is a detailed, partial section, on an enlarged scale, of one of the four roller assemblies mounted in the walls of the loading box.

The loading box includes a floor 66 and two upstanding wall portions 68. Floor 66 is approximately the same width as the open ended slot in the trailer but extends beyond the rear of the trailer as is apparent from FIGURES 1 and 3. This extension of the loading box facilitates the loading of fork lifts from elevated docks or warehouse platforms. The extending end of floor 66 is supported by bars 70 on each side of the loading box. Each of the loading box walls has two roller assemblies 72 (shown in detail in FIGURE 4) attached thereto which cooperate with U-shaped guide channels 74 to facilitate movement of the loading box. Guide channels 74 are fixed at their lower ends to the hoist support members 16 and 18 and the upper ends thereof are fixed to plate 46. Each guide rail is braced intermediate its end by a brace 76.

Each roller assembly consists of an elongated body 78 having four rollers mounted thereon and said body is attached to the loading box wall by welding or some other suitable means. The elongated body has an external roller 80 mounted at each end thereof which rides in guide channel 74, and two smaller rollers 82 and 84 rotatably mounted in openings 86 intermediate the ends of said elongated body. The rollers are each fixed to a shaft that is journaled in a bushing in elongated body 78. The function of the rollers is to reduce the effects of thrust and friction forces present between the loading box and its guide channels when the trailer is loaded in an unlevel position. An attempt was made to use guide rails instead of the roller assemblies; however, this approach was found to be unsatisfactory because guide rails were prone to bind in the guide channels if a heavily loaded loading box was raised or lowered when the trailer wasn't level. The roller assemblies cured this defect and the present trailer can be loaded with heavy vehicles even when tilted at a considerable angle.

The operation of the trailer is as follows, assuming it is desired to load a fork lift from an elevated warehouse platform or loading dock. The loading box 40 is raised to a height sufficient to clear the top of the platform and the rear end of the trailer is parked closely adjacent to said platform. The loading box is then lowered to a point where the rearwardly extending portion of the loading box floor rests on the platform. The fork-lift is then driven on to the loading box and the trailer is moved forward so that the loading box floor will clear the warehouse platform when lowered. The loading box is then lowered to trailer level and the fork lift is driven on to the trailer. Of course the fork lift can be winched into position, by winch mechanism 14, if it is disabled and cannot move under its own power.

While I have illustrated and described a preferred embodiment of my invention, it is to be understood that the scope of the invention is defined by the appended claims.

What is claimed is:

1. A trailer for transporting material handling vehicles comprising: a chassis, said chassis having two laterally spaced rearwardly extending support members that define therebetween a rearwardly opening slot through said chassis, a loading box disposed for vertical movement through the slot in said trailer, said loading box having a floor and upstanding sidewalls, hoist means mounted on each of said two support members and operatively connected to said loading box whereby said loading box can be raised from ground level to an elevated position, a pair of upstanding inwardly facing U-shaped channels secured at their lower ends to the inner surface of each of said support members, said channels being located one adjacent the forward portion of each of said box walls and one adjacent the rearward portion of each of said walls, a guide roller assembly engaging the inner surfaces of each of said U-shaped channels, said guide roller assemblies being rigidly attached to the box walls intermediate the floor of said box and the top of said walls, each of said roller assemblies having an upper and a lower roller contacting the lateral walls of said channels, and a pair of vertically spaced rollers intermediate said first mentioned rollers and contacting the inner surface of said channels.

2. The trailer recited in claim 1 wherein said hoist means includes: two upstanding, oppositely disposed hoists, one hoist being mounted on each of said support members, a first means connecting one of said hoists to one sidewall of said loading box, a second means connecting the other of said hoists to the other sidewall of said loading box, and support means for maintaining said hoists in a rigid upright position.

3. The trailer recited in claim 2 wherein said hoist means is mounted intermediate the forward and rearward edges of said side walls and further comprises a cylinder, an upwardly extending actuator rod and a horizontal shaft extending through the upper portion of said actuator rod, and wherein said means connecting said hoists to said sidewalls comprise a pair of flexible connecting means passing over said shaft and being equally spaced on either side of said actuator rod.

4. The trailer recited in claim 3 wherein there is provided a means for supporting said chassis which includes two sets of dual wheels for supporting the rearward end of said chassis, and means for mounting one set of said dual wheels beneath each support member whereby there will be no obstruction in the path of the loading box as it is lowered through the slot in the chassis to ground level.

References Cited in the file of this patent

UNITED STATES PATENTS

| | | |
|---|---|---|
| 1,917,621 | Weber | July 11, 1933 |
| 2,426,114 | Novotney | Aug. 19, 1947 |
| 2,752,052 | Trotter et al. | June 26, 1956 |
| 2,812,868 | Crile | Nov. 12, 1957 |
| 2,934,228 | Hillberg | Apr. 26, 1960 |

FOREIGN PATENTS

| | | |
|---|---|---|
| 1,120,502 | France | Apr. 23, 1956 |